Oct. 26, 1965

W. M. LEEDS 3,214,546

COMPRESSED-GAS CIRCUIT INTERRUPTERS HAVING IMPROVED ARC-EXTINGUISHING MEANS

Filed Oct. 12, 1961

6 Sheets-Sheet 1

WITNESSES

Edwin E. Bassler

James F. Young

INVENTOR

Winthrop M. Leeds

BY

Willard R. Crout

ATTORNEY

Oct. 26, 1965 W. M. LEEDS 3,214,546

COMPRESSED-GAS CIRCUIT INTERRUPTERS HAVING IMPROVED ARC-EXTINGUISHING MEANS

Filed Oct. 12, 1961

6 Sheets-Sheet 2

Oct. 26, 1965 W. M. LEEDS 3,214,546
COMPRESSED-GAS CIRCUIT INTERRUPTERS HAVING
IMPROVED ARC-EXTINGUISHING MEANS
Filed Oct. 12, 1961 6 Sheets-Sheet 4

Oct. 26, 1965 W. M. LEEDS 3,214,546
COMPRESSED-GAS CIRCUIT INTERRUPTERS HAVING IMPROVED ARC-EXTINGUISHING MEANS
Filed Oct. 12, 1961 6 Sheets-Sheet 6
Fig. 7A.
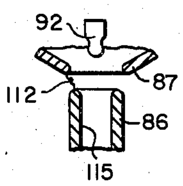
Fig. 7B.
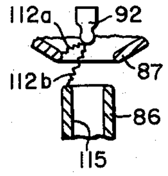
Fig. 8.
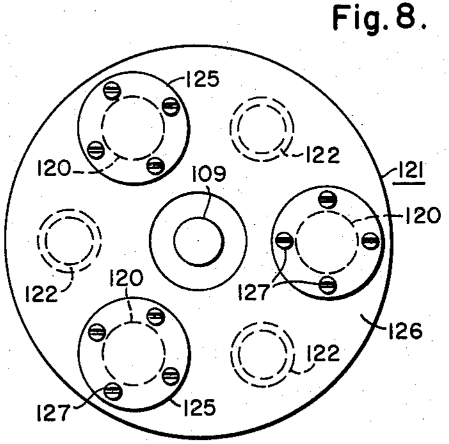
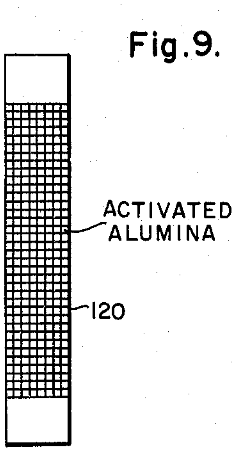
Fig. 10.
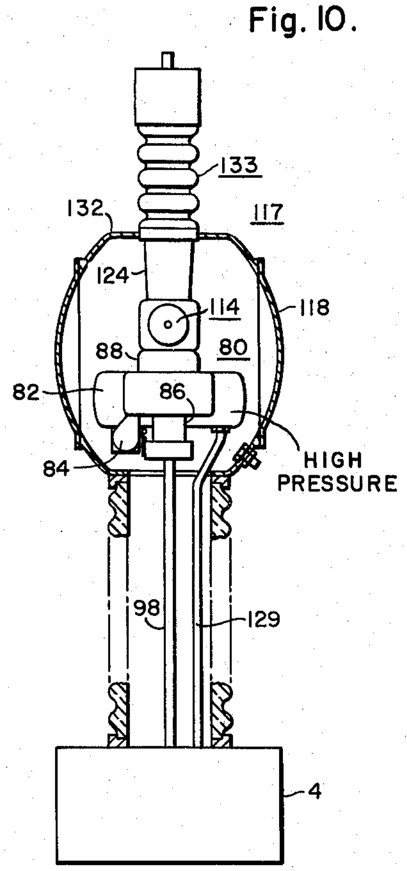

3,214,546
Patented Oct. 26, 1965

3,214,546
COMPRESSED-GAS CIRCUIT INTERRUPTERS HAVING IMPROVED ARC-EXTINGUISHING MEANS

Winthrop M. Leeds, Forest Hills, Pa., assignor to Westinghouse Electric Corporation, East Pittsburgh, Pa., a corporation of Pennsylvania Filed Oct. 12, 1961, Ser. No. 144,720
13 Claims. (Cl. 200—148)

This invention relates to circuit interrupters in general and, more particularly, to arc-extinguishing structures therefor.

A general object of the present invention is to provide an improved circuit interrupter which is of highly efficient operation, of compact size, and is economical to manufacture. Preferably such a circuit interrupter is adaptable for use over a wide current range.

A more specific object of the present invention is to provide an improved circuit interrupter, particularly adaptable for high-power application, in which a source of blast pressure is positioned closely adjacent to the contact structure to eliminate thereby any time lag for gas to flow through blast tubes to the contact structure for arc extinction.

In United States patent application filed September 24, 1959, Serial No. 842,069, now U.S. Patent 3,073,931, issued January 15, 1963 to Winthrop M. Leeds and assigned to the assignee of the instant application, there is illustrated and described a pressurized live metallic container disposed at the upper end of a supporting insulating column. In the closed-circuit position of the interrupter the metallic container is at line potential. As shown in the aforesaid patent, a high-pressure reservoir chamber is disposed interiorly of the outer live metallic casing, which contains exhausted gas at a relatively lower pressure, and a pair of terminal bushings extend into the outer casing supporting at their lower ends relatively stationary contact structures. The interrupter of the aforesaid patent contained piston-operated movable contacts, which were latched in their open position by suitable latching means; and a special closing pipe-line connection extended upwardly within the upstanding insulating support column to apply pressure to a pair of piston-actuated latch-relieving members to permit biasing means to return the movable contact structure to the closed-circuit position.

Accordingly, it is a further object of the present application to improve upon the circuit interrupter set forth in the aforesaid patent rendering it more compact in size and providing a direct positive mechanical arrangement for actuating the movable contact structure to the open and closed-circuit positions, rendering thereby the movement of the contact structure more positive in operation than would be the case if reliance were merely placed upon pressure for the opening and closing operations, as disclosed.

Still a further object of the present invention is to provide a high-power circuit interrupter utilizing resistance means serially connected into the circuit during a portion of the opening operation, and in which the arrangement and location of the several component parts is such that a resulting compact circuit interrupter of reduced size is obtained.

A further object of the present invention is the provision of an improved flexible contact separating structure which will be adaptable for carrying large values of current, yet may be easily actuated in the opening and closing directions.

Yet a further object of the present invention is the provision of an improved circuit interrupter incorporating modular units which may be used individually, or in series as desired, for various voltage and current ratings.

Still a further object of the present invention is the provision of an improved shunting resistance assemblage associated with the contact structure of a high-power circuit interrupter.

A further object of the present invention is the provision of an improved mechanical actuating arrangement for mechanically actuating the movable contact structure in a circuit interrupter of the type involving a live metallic tank disposed at the upper end of a supporting column structure.

Further objects and advantages will readily become apparent upon reading the following specification, taken in conjunction with the drawings in which:

FIG. 7A is a fragmentary view of the contact structure of FIG. 7 during a portion of the interrupting operation;

FIG. 7B is another fragmentary view of the contact structure of FIG. 7 during a portion of the interrupting operation;

FIG. 8 is a top plan view of one of the bushing-cap structures of the circuit interrupter illustrated in FIG. 7;

FIG. 9 is a side elevational view of one of the removable filter cartridges, which may be removed from the bushing-cap of FIG. 8; and, FIG. 10 illustrates a modified type of construction involving only a single arc-extinguishing unit with the live tank constituting one of the line terminals of the modified-type circuit interrupter.

Figure 1:
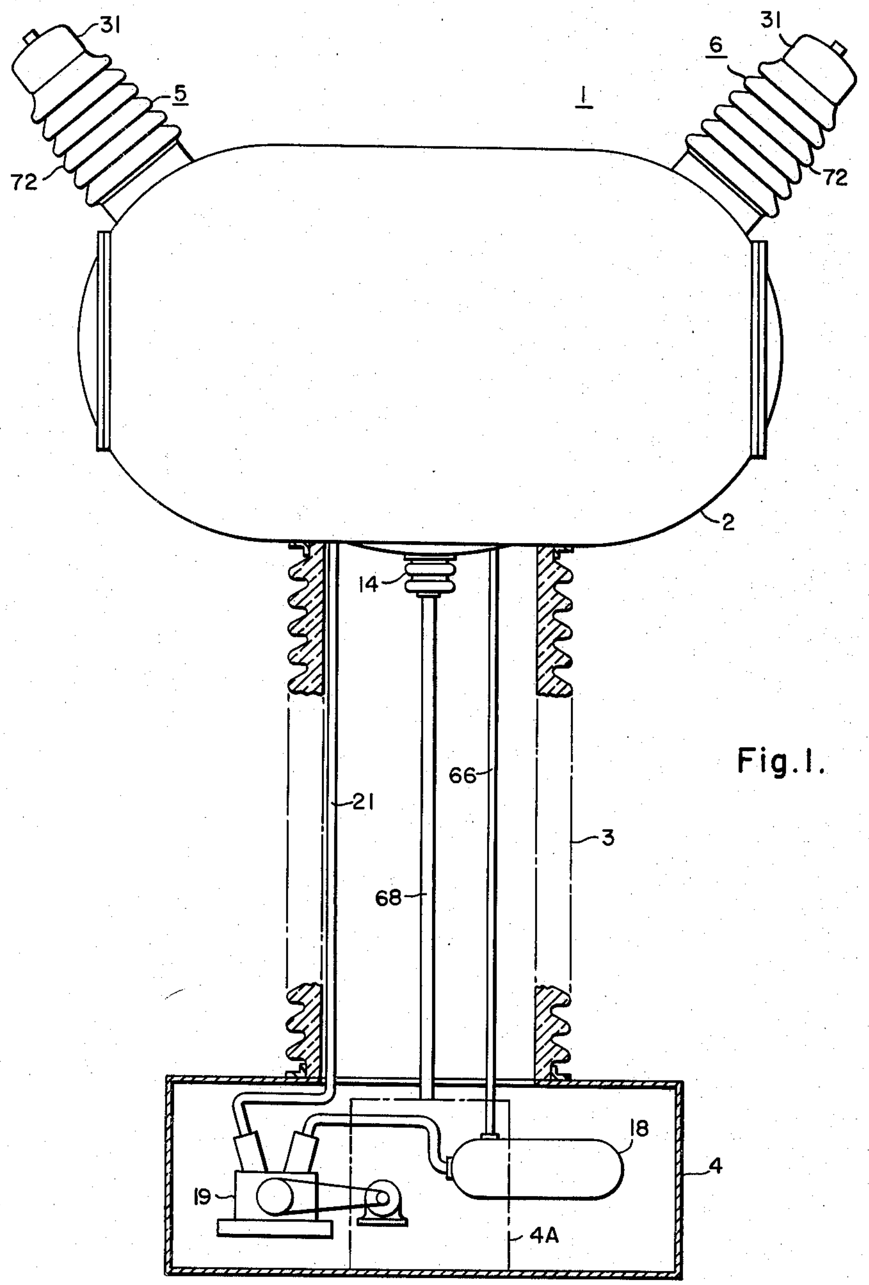
FIGURE 1 is a side elevational view, with a portion in vertical section, of a single unit of a circuit interrupter embodying features of the present invention.

Referring to the drawings, and more particularly to FIG. 1 thereof, the reference numeral 1 generally designates a high-power compressed-gas circuit interrupter. As shown the high-power circuit interrupter 1 comprises a live metallic tank 2 supported at the upper end of an insulating hollow column 3, in turn supported upon a lower base mechanism compartment 4.

Figure 3:
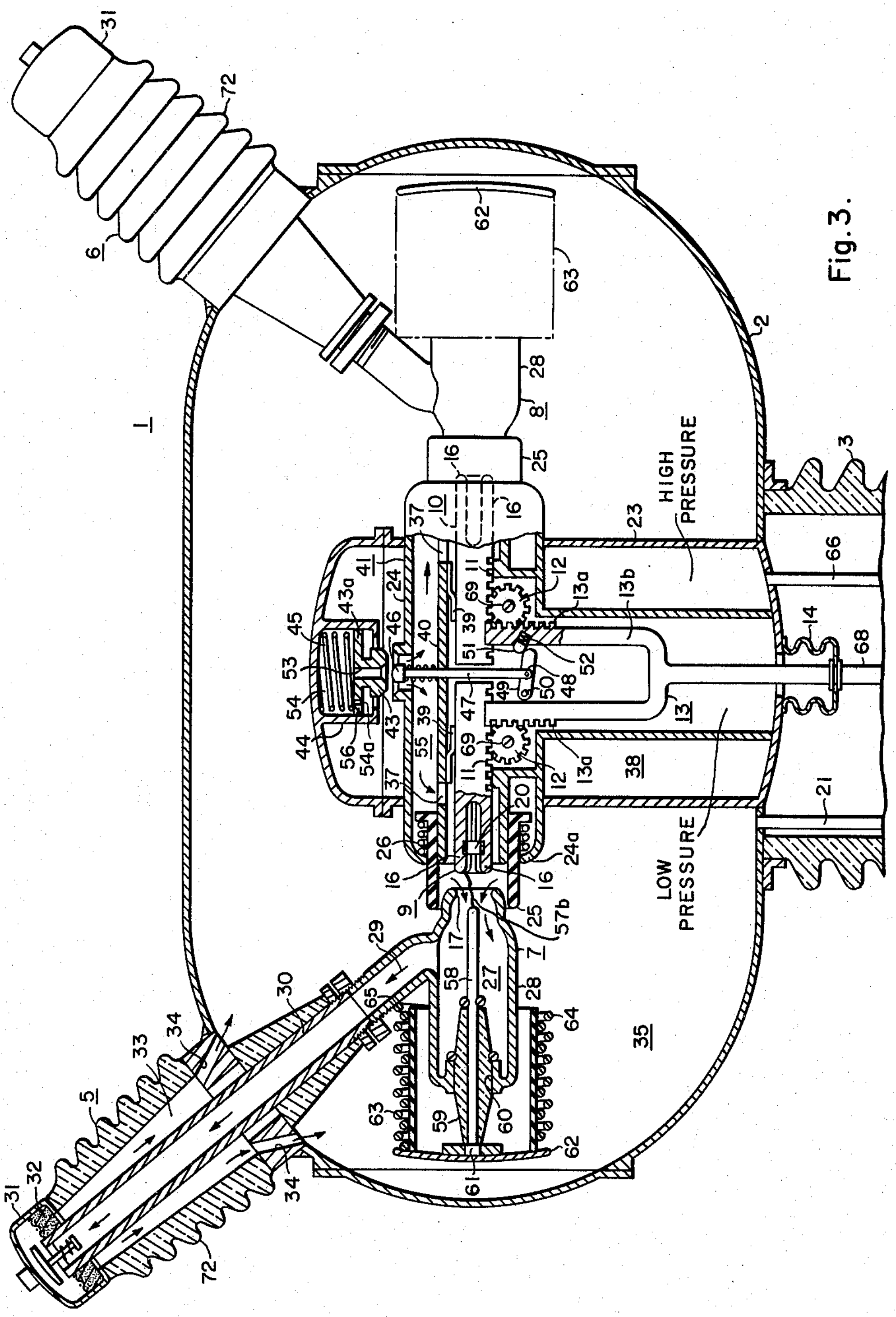
FIG. 3 is a view similar to that of FIG. 2, but illustrating the contact structure in the partially open-circuit position.

Extending downwardly interiorly within the live metallic tank 2 is a pair of terminal bushings 5, 6 which support relatively stationary contact structures, generally designated by the reference numerals 7, 8 respectively in FIG. 3, of the drawings. With reference to FIG. 3, it will be noted that cooperable with the relatively stationary contact structures 7, 8 is a pair of movable contacts 9, 10 having rack surfaces 11. Pinion gears 12 mesh with the rack surfaces 11 and, in turn, are actuated by a vertically reciprocating yoke-shaped operating rod 13. The operating member 13 extends through a metallic bellows 14, for sealing purposes, and extends downwardly through the insulating column 3 to the mechanism compartment 4, wherein a suitable mechanism, diagrammatically indicated as 4A, serves to actuate the same.

Figure 2:
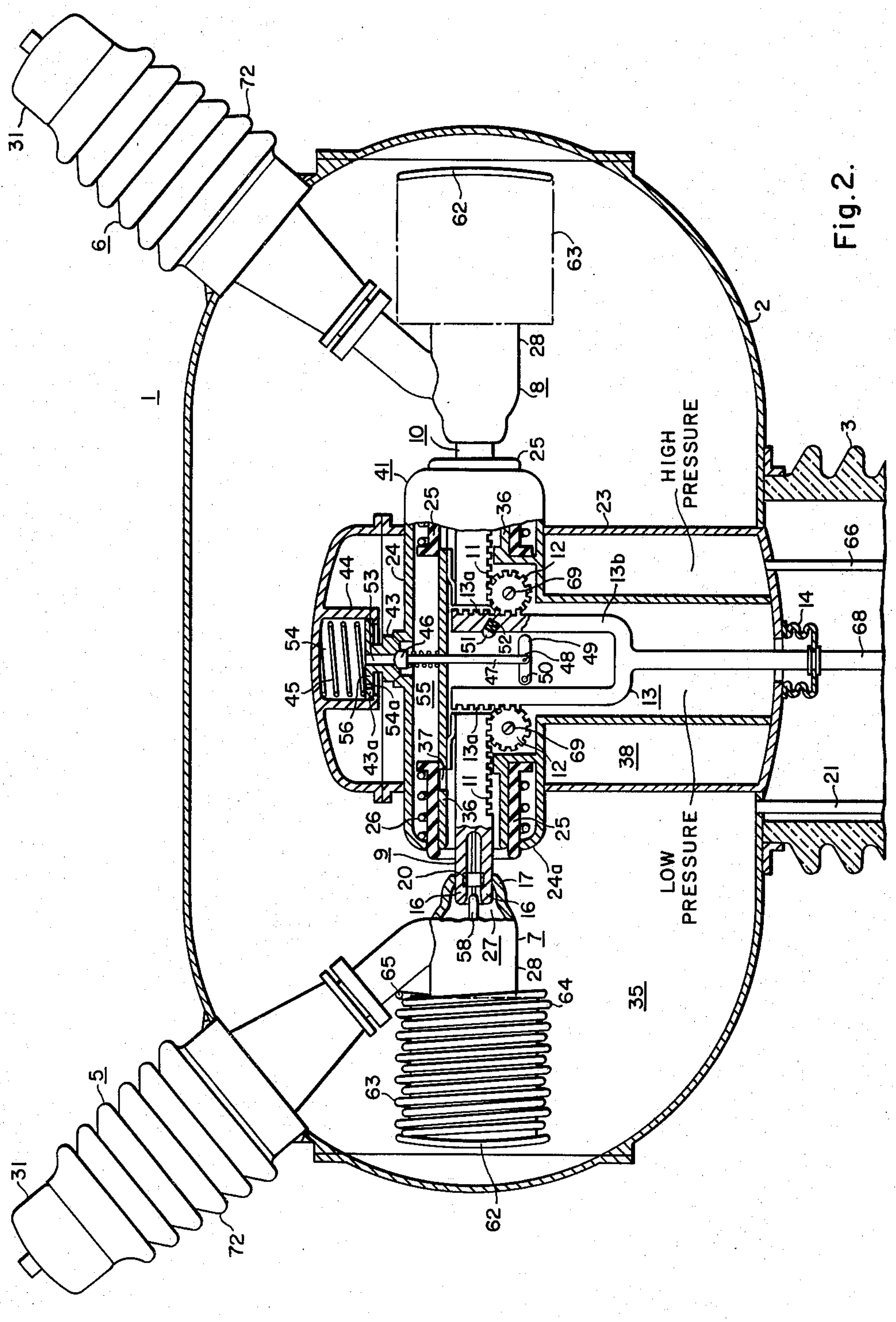
FIG. 2 is an enlarged longitudinal sectional view taken through the live-tank structure of circuit interrupter of FIG. 1, the contact structure being illustrated in the closed-circuit position.

From the foregoing description of the invention, it will be apparent the upward vertical movement of the insulating operating rod 13 causes upward corresponding movement of the rack surfaces **13*a* thereof to effect closing rotation of the pinion gears 12, and consequent closing movement of the movable contacts 9, 10 into contacting engagement with the relatively stationary contact structures 7, 8**. FIG. 2 illustrates the circuit interrupter in the closed-circuit position.

Preferably the movable contacts 9, 10 have saw-cuts 15 therein (FIG. 4A) to provide resilient contact fingers 16 which make contacting engagement with orifice portions 17 of the relatively stationary contact structures 7, 8 respectively. To back up the contact fingers so as to increase the contact engagement pressure, preferably a split steel ring 20 is inserted within the contact fingers 16, as shown more clearly in FIGS. 4 and 4A of the drawings. As a result, there is provided multiple flexible fingers 16 which resiliently engage the arcing tip portions **17*a* of the orifice-shaped stationary contacts 17**.

Disposed substantially centrally within the outer tank structure 2 is a high-pressure reservoir 23 containing a high-pressure gas, such as sulfur hexafluoride ($SF_6$) gas at a pressure say of 100 to 200 p.s.i. Preferably the high-pressure reservoir 23 assumes the form of an upstanding cylindrically-shaped tank, as shown in FIG. 3. Extending generally transversely diametrically through the cylindrically-shaped pressurized tank structure 23 is a generally horizontally-disposed cylindrically-shaped blast tube 24, the ends **24*a* of which serve as guides for a pair of retractable insulating guides, or blast tubes 25, which are spring-biased inwardly by a pair of biasing compression springs 26**. Certain features of the blast-tube construction are set forth and claimed in United States patent application filed April 11, 1961, Serial No. 102,176 by Charles F. Cromer, and assigned to the assignee of the instant application.

The purpose of each of the insulating tubular guide tubes 25 is to insure that all of the gas blast will be directed into the hollow interior 27 of the hollow exhaust chamber 28 constituting a portion of the relatively stationary contact structures 7, 8. As indicated by the arrows 29, the exhausting gas passes upwardly through the hollow tubular terminal stud 30 and into the bushing-cap 31, wherein the exhausted gas is filtered by filter cartridges 32 and subsequently passes down the annular region 33 through outlet ports 34 associated with the terminal bushings 5, 6 and into the general interior 35 within the tank structure 2.

To additionally assist in the guiding action of the retractable insulating tubes 25, there is also provided metallic sleeve portions 36 having inlet openings 37, through which the gas blast may pass from the high-pressure region 38 interiorly of the reservoir tank 23.

To electrically interconnect the movable contacts 9, 10 there is provided a pair of spring fingers 39 secured to a guide-tube section 40 and bearing upon the upper sides of the movable contacts 9, 10 as shown in FIG. 3. As a result, the current path from the movable contact 9 is through the left-hand spring finger 39, conducting guide-tube section 40, through the right-hand spring finger 39 and to the right-hand movable contact 10 of the interrupting assembly 41. The gas blast flowing out of the pressurized chamber 23 is controlled by a blast valve 43 slidable within an operating cylinder 44 and biased downwardly toward a closed position by a compression spring 45. A pilot valve 46, attached to the upper end of a pilot-valve stem 47, is pivotally secured, as at 48, to a valve-actuating lever 49. The valve-actuating lever 49 is pivotally mounted on a stationary pivot 50.

Secured into the side of one the upstanding legs **13*b* of the yoke-shaped operating member 13 is a latch 51, which actuates the right-hand end of the valve-actuating lever 49 during the opening operation. However, during the closing operation of the interrupter assembly 41 engagement of the latch 51 with the valve lever 49 is in such a direction to force the latch 51 downward, compressing biasing spring 52 until the latch slips past. Non-operation of pilot-valve 46 conserves the pressurized gas during the closing operation when it is not needed. The downward opening movement of the pilot valve 46 away from a dump port or opening 53, associated with the blast valve 43, will dump the pressure from within the region 54 in back of the blast-valve piston 43*a* to the relatively low-pressure region 55. When this occurs, the high-pressure gas within the region 38 will act upwardly upon the annular surface 56 and effect thereby rapid upward opening of the blast-valve 43. The opening of the blast valve 43 will permit a blasting of gas out of the region 38 longitudinally in opposite directions through the blast-tube section 24 and quickly effect extension of the two guide tubes 25** to the extended positions shown in FIG. 3 of the drawings.

Figures 3A, 4, 4A, 4B, 4C:
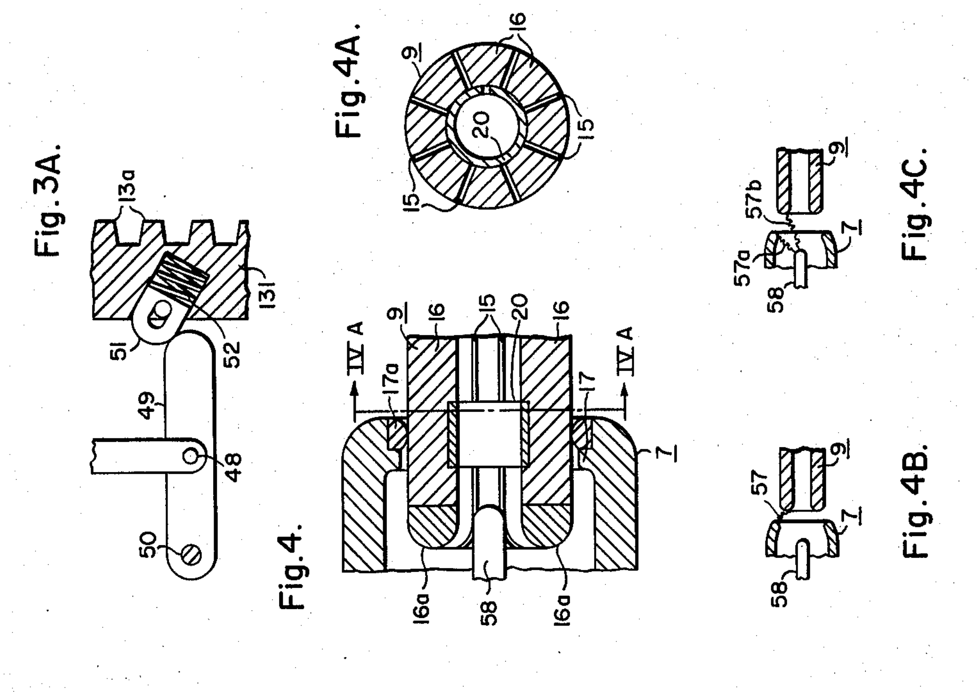
FIG. 3A is an enlarged detail view of the latch for blast valve operation for the interrupter of FIG. 3.
FIG. 4 is an enlarged detail view of the resilient separable contact structure employed in the circuit interrupter of FIG. 3, the contact structure being illustrated in the closed-circuit position.
FIG. 4A is a sectional view taken along the line 4A—4A of FIG. 4 looking in the direction of the arrows.
FIGS. 4B and 4C are fragmentary views illustrating arc locations during the interruption process of the breaker of FIG. 3.

An arc 57 will initially be established between each movable contact 9, 10 and the respective stationary contact 7, 8 as shown in FIG. 4B. The gas blast will cause the initially established arc 57 to become sectionalized into arc portions **57*a*, 57*b* as shown in FIG. 4C, the blasting of the gas carrying the arc portion 57*b* to a resistor probe 58. Resistor probe 58 is associated with an insulator, or terminal resistance bushing 59 (FIG. 3) fixedly secured within an opening 60 associated with the rear or outer end of the exhaust chamber 28. The other end 61 of the resistor probe 58 is electrically connected to a resistor plate 62 and through a relatively low resistance 63, say of the order of approximately 50 to 200 ohms, for example. The right-hand end 64 of the resistor 63 is electrically connected, as at 65, to the exhaust chamber 28**.

To replenish the gas which is used from the pressurized reservoir 23 there is provided an insulating feed conduit 66 which passes upwardly through the interior of the hollow insulating column 3 from a grounded pressure tank 18, as shown in FIG. 1. A compressor 19 may be used to recompress the gas from the exhaust pipe line 21.

The opening operation of the circuit interrupter 1 will now be described. During the opening operation of the interrupter, suitable mechanism, diagrammatically illustrated as 4A in FIG. 1, disposed within the lower base mechanism compartment 4 is effective to cause downward opening movement of the insulating operating rod 68. This will effect downward opening movement of the yoke-shaped member 13, secured to the upper end of the insulating rod 68. Due to the provision of the rack surfaces **13*a*, the pinion gears 12 will be rotated about their pivots 69 and will effect inward opening movement of the two movable contacts 9, 10. The latch 51 operating on lever 49 activates the pilot-valve 46, which in turn permits blast-valve 43 to open as described above. The separation of the movable contacts 9, 10 from the stationary contacts 7, 8 will effect the drawing of two serially related arcs 57 between the tip extremities 16*a* of the finger contacts 16 of the movable contacts 9, 10 and the arc-resisting tip portions 17*a* of the relatively stationary contact structures 17. The arcs 57 (FIG. 4B) which are drawn, will be rapidly transferred to the resistor probes 58 to insert the resistance sections 63 serially into the circuit by extinction of arc sections 57*a*** (FIG. 4C). The relatively low-value resistor current, which is carried by the resistor arc portion 57*b*, will be extinguished at the next current zero, and the continued downward opening movement of the yoke-shaped member 13 will effect passage of the latch 51 below the valve-actuating lever 49 to permit the closing of the pilot-valve 46. The closing of the pilot-valve 46 will permit pressurizing of the region 54 through the opening 54*a* and consequent closure of the main blast valve 43 assisted by the compression spring 45.

The closing of the main blast valve 43 will cut off the gas blast and will permit the compression springs 26 to effect retraction of the insulating guide tubes 25 to the retracted positions illustrated in FIG. 2 of the drawings.

The exhausted gas used during an interrupting operation passes upwardly through the hollow tubular conductor studs 30 (FIG. 3) and through filter cartridges, or filter means 32 disposed at the upper ends of the bushing-caps 31. The exhaust gas then passes downwardly along the inner walls of the porcelain casings 72 and through suitably provided openings 34 into the general interior 35 within the tank structure 2. Certain features of filtering the gas, as described, are set forth and claimed in United States patent applications filed February 7, 1964, Serial No. 343,371 and July 9, 1964, Serial No. 384,021 by Winthrop M. Leeds, and assigned to the assignee of the instant application.

To effect a closing operation of the circuit interrupter 1, the operating mechanism 4A, disposed within the base compartment 4 is effective to cause upward closing movement of the yoke-shaped member 13. Through the consequent rotation of the pinion gears 12, the movable contacts 9, 10 will be moved outwardly in opposite directions to make contacting engagement with the relatively stationry contact structures 7, 8 in the manner illustrated in FIGS. 2 and 4 of the drawings.

Desirable features for a high-power, high-voltage SF6 or other highly-effective-gas circuit breaker capable, for instance, of interrupting 50,000 amperes at 230 kv., three-phase, are as follows:

(1) High-pressure and low-pressure reservoirs for the $SF_6$ or other highly effective gas should be in metal tanks insulated from ground to keep the time to a minimum for the gas blast to reach the arcing contacts.

(2) Large metallic orifice-type stationary contacts should be used through which the gas blast is vented and then filtered before exhausting into the low-pressure reservoir.

(3) Low-value resistors (approximately 50 to 200 ohms, for example, for each of the two breaks per pole for a 230 kv. breaker rating) should be arranged to be inserted into the circuit by the arcs drawn at the breaker contacts.

The circuit interrupter 1 illustrated in FIGS. 1–4 accomplishes the above purposes by the use of a number of novel features. The main steel tank 2 is mounted upon a porcelain column 3 to insulate it from ground, and it contains a highly effective gas, such as $SF_6$ gas, at a relatively low pressure, say from 30 to 60 p.s.i., for example. Two terminal bushings 5, 6, rated about 115 kv., lead current into and out of the tank 2. The contact and blast-valve assembly is associated with a high-pressure reservoir 23 welded into the low-pressure tank 2, as shown. The pressure of the $SF_6$ gas or other highly effective gas within this inner tank 23, would be in the range from, say 100 to 200 p.s.i. Insulating pipes 21, 66 lead from the low-pressure tank 2 down through the supporting porcelain column 3 to a compressor 19 and auxiliary high pressure reservoir 18, and then back up to the high-pressure reservoir 23 at high potential. For convenience to obtain a straight-line contact motion in a horizontal plane from the vertical motion of an operating rod connected to a conventional operating mechanism 4A, a system of racks and pinions are shown. Certain features of the rack and pinion arrangement are set forth and illustrated in United States patent application filed October 30, 1957, Serial No. 693,306, now U.S. Patent 3,060,294, issued October 23, 1962 to Winthrop M. Leeds, and assigned to the assignee of the instant application. It would be possible to design lever systems to perform the same contact moving function if desired in place of the rack and pinion arrangement.

The tubular tip of each of the two moving contacts 9, 10 is made into a group of flexible fingers 16 by saw cuts, and a spring force to oppose inward radial compression of the fingers 16 is obtained from a split steel ring 20 inserted inside. These contacts 9, 10 are pushed into the circular opening 17*a* of the stationary contact metallic orifices 17, which are part of the hollow exhaust assembly 28 attached to each terminal bushing 5, 6. Arc resisting-material is preferably used at the last points 16*a*, 17*a* to separate, as shown in FIG. 4 of the drawings. Through the center of each of these chambers 28 is a resistor probe conductor 58 running through an insulating terminal resistance bushing 59 to the resistor assembly 64. One end 62 of the resistor assembly is connected to this probe conductor 58, and the other end 65 of the resistor assembly 64 is connected to the base 28 of the main terminal bushing 5 or 6.

It is to be noted that the gas exhausted into the chamber 28 on each terminal bushing 5, 6 is conducted through the hollow terminal stud 30 up to a filter 32 in the cap 31 and then back down to the tank 2 through the space 33 between the terminal 30 and the weather casing. Briefly, an opening operation of breaker 1 is as follows: Tripping the breaker mechanism 4A causes the operating rod 68 to move downwardly, driving the pair of contacts 9, 10 horizontally toward each other and drawing arcs 57 from each contact tip 16*a* to the metallic orifice stationary contacts 17. At the same time, the pilot valve 46 is opened, releasing pressure from behind the blast piston 43*a* so that the high-pressure opens the blast-valve 43. Gas flows in direction of the arrows 29 to the contact tips, at the same time forcing an insulating tube 25, (which acts as a slide valve, momentarily holding back the gas flow) outwardly to bridge the gap to the stationary contacts 17 so as to direct the gas flow into the orifices, instead of out into the tank 2. The gas flow drives the arcs 57 toward the central resistor probes 58 and quenches the arc segments 57*a* (FIG. 4C) between the probe 58 and the metal orifice 17 to insert the resistor 64 into the circuit. At the next current zero or shortly thereafter, the resistor current arc 57*b* from the tip of the moving contact 9 to the probe 58 is extinguished. After the pilot valve 46 is released, the blast-valve 43 closes, and then a retrieving spring 26 retracts the insulating tube 25 from around the orifice 17 so as to leave a clear isolating gap between the stationary contact assembly.

When the contacts are closed by the operating mechanism 4A, the resistor probe 58 is set back far enough so that no current flows through the resistor 64, eliminating thereby undesirable heating of the resistor 64.

Figure 5:
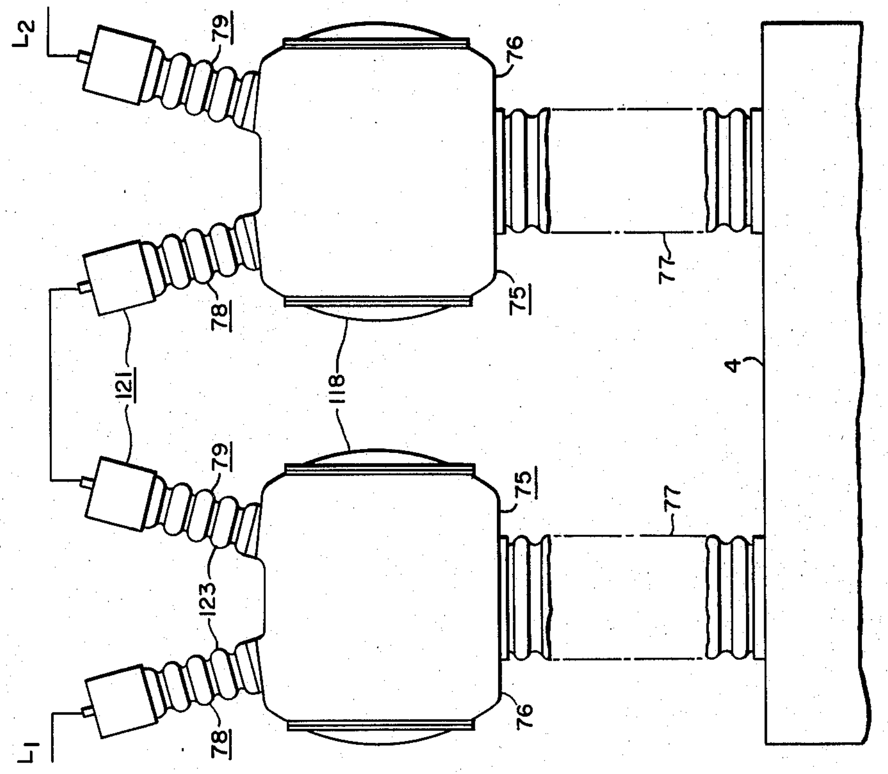
FIG. 5 is a two-unit, high-power circuit interrupter involving a pair of series modular units of the type set forth in FIG. 6.

With reference to FIGS. 5–10 of the drawings, it will be observed that there is provided a modified-type circuit-interrupter assembly, generally designated by the reference numeral 75. Two such assemblies 75 may be employed, as illustrated in FIG. 5, or one assembly 75 may be used alone for the lower-current and voltage applications as shown in FIG. 10.

Figures 6, 7:
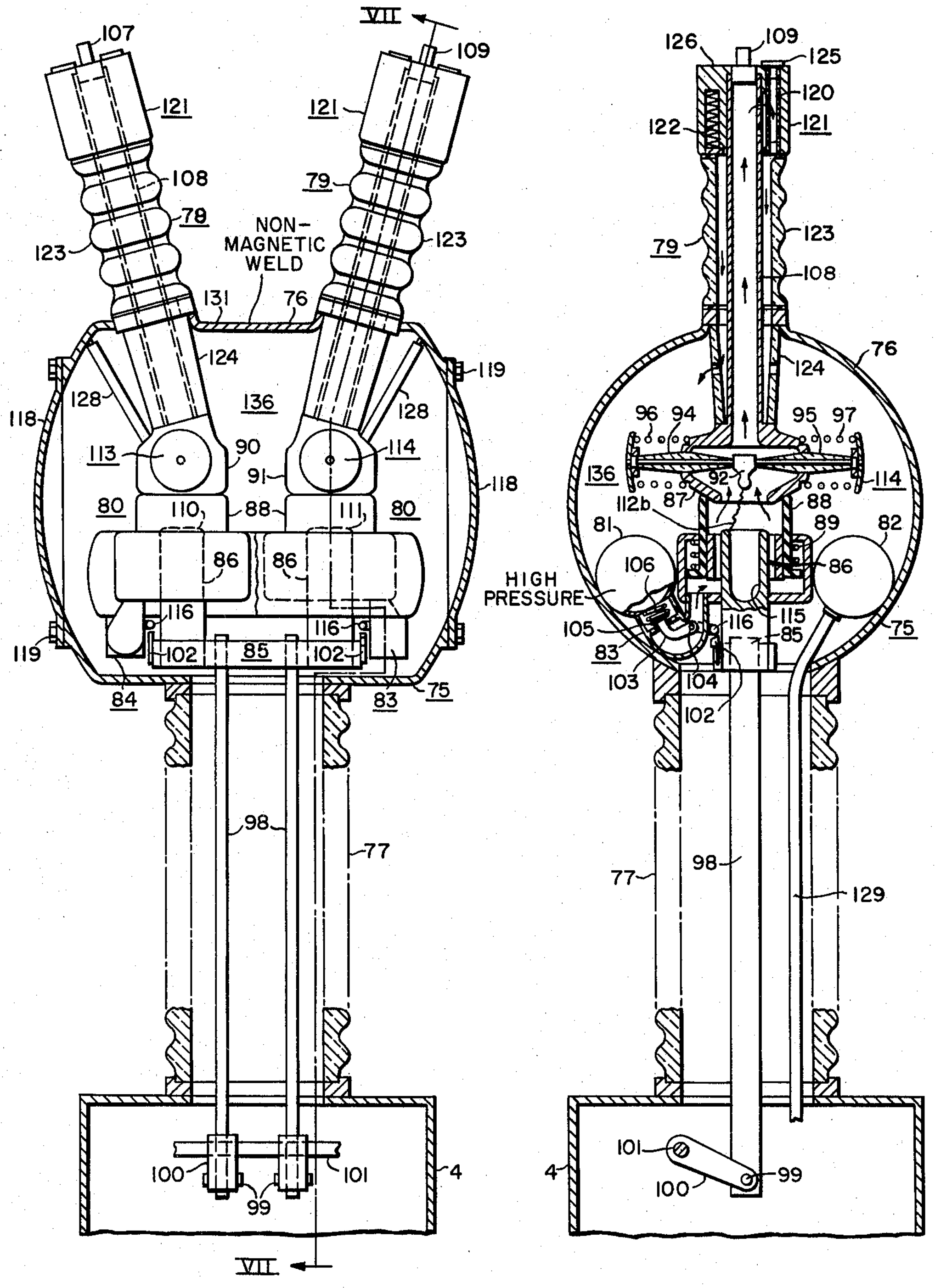
FIG. 6 is a longitudinal sectional view taken through one of the modular interrupting units illustrated in FIG. 5, the contact structure being illustrated in the partially open-circuit position.
FIG. 7 is a vertical sectional view taken substantially along the line VII—VII of FIG. 6, the contact structure also being illustrated in the partially open-circuit position.

With reference to FIGS. 6 and 7 of the drawings, it will be observed that the circuit-interrupting assembly 75 generally comprises a live metallic tank 76 surmounted upon an upstanding hollow insulating column 77, preferably composed of some suitable weatherproof material, such as porcelain, or the like.

Extending downwardly within the live metallic tank 76 is a pair of terminal bushings 78, 79 having associated therewith adjacent the lower ends thereof a serially related pair of arc-extinguishing units 80. As will be brought out more clearly hereinafter, a pair of serially-related units 80 may be utilized, as illustrated in FIGS. 6 and 7, or a single unit 80 may be employed, as is illustrated in FIG. 10 of the drawings for lower-voltage and current applications.

As compared with the interrupting assembly 41 of FIGS. 2 and 3, it will be noted that in the modified-type of interrupting assemblies 75, illustrated in FIGS. 6 and 7, a pair of longitudinally extending high-pressure reservoir tanks 81, 82 are used. Each reservoir tank 81, 82 has its own individual blast-valve assembly 83, 84 respectively. With the construction illustrated, it is possible to employ a generally U-shaped conducting bridging cross-bar, generally designated by the reference numeral 85, and comprising a pair of serially related upstanding tubular movable contacts 86. The movable contacts 86 cooperate with a pair of relatively stationary orifice-shaped contacts 87. As was the case with the interrupting assemblage 41 of FIGS. 2 and 3, a retractable insulating tubular flow director 88 is employed, biased downwardly by a retracting spring 89. As was the situation in the interrupter of FIGS. 2 and 3, again the gas blast is relied upon to effect forward extension of the tubular flow directors 88 into engagement with the relatively stationary contact structures 90, 91. Each relatively stationary contact structure 90, 91 has a resistor probe 92, associated therewith, which is disposed intermediate a pair of insulating bushings 94, 95. A pair of parallel-disposed relatively-low ohmic-value resistors 96, 97 are used in place of a single resistor 64, as was the situation in FIGS. 2 and 3 of the drawings.

To effect downward opening movement of the conducting cross-bar 85, there is provided a pair of spaced insulating operating rods 98 pivotally connected, as at 99 (FIG. 7), to a pair of crank arms 100. The pair of crank arms 100, in turn, are keyed to a rotatable drive shaft 101, which may be actuated by any suitable mechanism, not shown.

Pivotally secured to, and movable with the conducting cross-bar 85 is a pair of latches 102, which serve to actuate a pair of blast-valve levers 103 pivotally mounted, as at 104, to stationary pivots. The opening rotative movement of the blast-valve levers 103 will effect opening of blast valves 105, which are biased toward a closed position by compression springs 106.

In the partially open-circuit position of the interrupter 75, illustrated in FIGS. 6 and 7 of the drawings, it will be obvious that the series current passes through the outer terminal lead 107, hollow conducting tube 108, relatively stationary contact structure 90, orifices-shaped contact 87, movable tubular contact 86, conducting cross-bar 85, through the other arc-extinguishing unit 80 in a similar manner to the right-hand terminal stud 109 shown in FIG. 7.

The opening operation of the circuit interrupter 75 will now be described. During the opening operation, the rotatable drive-shaft 101 is actuated in a clockwise direction, as viewed in FIG. 7. This rotative movement of the drive shaft 101 will correspondingly effect downward opening movement of the spaced operating rods 98 to effect downward opening movement of the cross-bar 85. The latches 102, carried by the conducting cross-bar 85, will effect rotation of the blast-valve levers 103 and will effect opening of the blast valve 105 to permit thereby a blast of gas to pass upwardly into the relatively stationary arcing chamber 110, 111, wherein the gas blast effects upward extension of the insulating tubular guide tubes 88. The downward separating opening movement of the movable tubular contacts 86 away from the relatively stationary orifice-shaped contacts 87 will cause arcs 112 to extend therebetween, as shown in FIG. 7A. The gas blast will cause the arcs 112 each to extend into two portions **112*a* and 112*b*, as shown in FIG. 7B. The gas blast will effect extinction of the arc portion 112*a*, and will cause thereby the current to pass through the series resistance assemblies 113, 114, each of which comprises a pair of parallel resistor sections 96, 97. The provision of a pair of parallel resistor sections 96, 97 results in more effective utilization of the space and also a diminution of the amount of current carried by each resistor assembly 96, 97. The gas blast passing upwardly through the tubular conductor tubes 108 will effect extinction of the residual-current arc 112*b* extending between the resistor probe 92 and the inner surface 115 of the tubular movable contact 86** to quickly effect the extinction thereof.

Continued downward opening movement of the operating rods 98 and conducting cross-bar 85 will cause the latches 102 to ride off of the latch portions 116 and permit the compression springs 106 to effect reclosure of the main blast valves 105.

The cessation of the gas blast out of the high-pressure reservoir chambers 81, 82 will permit the retracting compression springs 89 to effect retraction of the movable tubular insulating guide tubes 88 to provide thereby a pair of open gaps between the separated contact structures 86, 87 in the fully open-circuit position of the circuit interrupter 75.

To facilitate maintenance operations, preferably a pair of cover plates 118 are provided at the outer ends of the tank structure 76 and are bolted thereto by mounting bolts 119.

An important feature of the invention is the provision of filter cartridges 120, shown more clearly in FIG. 9 of the drawings. With reference to FIG. 8 of the drawings, it will be noted that the terminal bushing-cap 121 encloses a plurality, in this particular instance 3, filter cartridges 120. Disposed intermediate the spaced filter cartridges 120 are a plurality, in this particular instance three, heavy compression springs 122, which serve to impose compressive force upon the insulating casings 123, 124 associated with the terminal bushings 78, 79.

Preferably each filter cartridge 120 has a removable plate 125 associated therewith, which is secured to the upper surface 126 of the bushing-cap 121 by a plurality of bolts 127. Upon removal of the bolts 127 and the plates 125, the filter cartridges 120 may be removed upwardly out of the terminal bushing-cap structures 121 for reprocessing or replacement, as desired.

To bring about a substantially equal voltage division between the interrupting units 80, preferably a pair of voltage dividers 128 are utilized. The voltage dividers 128 normally would comprise capacitor tubes as shown.

To replenish the high-pressure gas which is used out of the high-pressure reservoir tanks 81, 82, there is provided an insulating feed conduit 129 which interconnects the high pressure reservoir 18 (FIG. 1) at ground potential with the high-pressure high-potential reservoir tanks 81, 82 disposed interiorly within the tank structure 76.

The modified-type circuit interrupters 75, illustrated in FIGS. 5–10 of the darwings, relate to a novel type of live tank $SF_6$, or other effective gas-type power circuit breaker suitable for use in series-connected units at voltages of 500 kv., or higher. The two-break units shown in FIGS. 6 and 7 could be rated between, say 161 kv., 3000 amperes, 120,000 mva. It will be apparent that many novel features may be incorporated in the modified-type design 75 to make it even more compact and capable of higher continuous current-carrying capacity than the interrupting assembly 41 illustrated in FIGS. 2 and 3 of the drawings. For instance, two high-pressure reservoirs 81, 82 are used instead of one in the center, thus permitting the contact assemblies and terminal bushings 78, 79 to be brought closer together. A non-magnetic weld 131 between the terminal bushings 78, 79 reduces heating in the tank 76 from iron losses at high load currents. Vertical contact motion permits a U-shaped moving contact bridging member 85 requiring no sliding contacts or shunt connections. The resistor units 113, 114 are split into two parallel resistors 96, 97 on each terminal 78, 79 for better space utilization and lighter parts to handle. Each reservoir 81, 82 has a blast-valve 105, one connecting to each interrupter 80. Valve latches 102 at each end of the contact cross-arm 85 engage levers 103 which force open the blast valves 105, and then release before the end of the stroke. Large chambers on the top of the bushings provide room for exhaust gas expansion and cooling. Three tubular filter screens 120 are removable from the cap 121 for cleaning trapped fluoride powders during maintenance operations. Between the screens 120 are three springs 122 to maintain pressure on the gaskets at each end of the porcelain weather casings 123, 124.

It is to be observed that a single-break for a lower-voltage unit 117 can easily be made using a smaller tank 132 and only one bushing 133, as illustrated in FIG. 10 of the drawings. Two double-break units 75 (FIG. 5) are recommended in series for 345 kv., 25,000 mva., and three double-break units for 500 kv., 35,000 mva.

Again the high-pressure reservoir tanks 81, 82 may contain a suitable arc-extinguishing gas, such as sulfur hexafluoride $SF_6$ gas, say at a pressure of 150–200 p.s.i., whereas the interior 136 within the tank structure 76 may contain the gas at a lower pressure, say 30 to 60 p.s.i., for example.

It is to be observed that the interrupting assemblies 41, 80 may be employed either individually, or as modular units for series arrangement for the higher voltage and current ratings.

Although there have been illustrated and described specific structures, it is to be clearly understood that the same were merely for the purpose of illustration, and that changes and modifications may readily be made therein by those skilled in the art, without departing from the spirit and scope of the invention.

I claim as my invention:

1. A compressed-gas circuit interrupter including a metallic tank, means including an upstanding insulating column for supporting said metallic tank up in the air above ground potential, a pair of terminal bushings extending into said metallic tank and supporting relatively stationary contact structures at their interior ends, each relatively stationary contact structure including means defining a relatively stationary exhaust chamber, the pair of terminal bushings including tubular conductor studs communicating with said exhaust chambers, relatively movable bridging contact means interconnecting said spaced pair of relatively stationary contact structures, a terminal resistance bushing extending through an outer end of each exhaust chamber, a resistance means supported externally of each exhaust chamber and having one end thereof connected to the outer end of the respective terminal resistance bushing, a resistance probe affixed to the inner end of each terminal resistance bushing so that an established arc may transfer thereto, and actuating means extending upwardly through the hollow insulating column for mechanically opening said relatively movable bridging contact means.

2. A compressed-gas circuit interrupter including a metallic tank, means including an upstanding insulating column for supporting said metallic tank up in the air above ground potential, a pair of terminal bushings extending into said metallic tank and supporting relatively stationary contact structures at their interior ends, each relatively stationary contact structure including means defining a relatively stationary exhaust chamber, the pair of terminal bushings including tubular conductor studs communicating with said exhaust chambers, relatively movable bridging contact means including a pair of movable tubular contacts interconnecting said spaced pair of relatively stationary contact structures, a pair of retractable insulating guide tubes for directing the gas blast into the exhaust chambers, a terminal resistance bushing extending through an outer end of each exhaust chamber, a resistance means supported externally of each exhaust chamber and having one end thereof connected to the outer end of the respective terminal resistance bushing, a resistance probe affixed to the inner end of each terminal resistance bushing so that an established arc may transfer thereto, and actuating means extending upwardly through the hollow insulating column for mechanically opening said relatively movable bridging contact means.

3. The combination in a compressed-gas circuit interrupter of a metallic high-potential exhaust tank, a pair of terminal bushings having hollow conductor studs extending into said metallic high-potential exhaust tank and carrying metallic exhaust chambers at their inner ends, a pair of orifice-shaped relatively stationary contacts forming a portion of said metallic exhaust chambers, a pair of cooperable movable tubular contacts cooperating with the pair of orifice-shaped relatively stationary contacts to establish a pair of serially-related arcs, filtering means associated with each terminal bushing to purify the arced gas, a high-pressure reservoir disposed within the metallic high-pressure exhaust tank, blast-valve means for releasing a blast of gas from said interiorly-disposed high-pressure reservoir, actuating means actuated from ground potential for effecting opening motion of the pair of cooperable movable tubular contacts, and the exhaust arced gas passing through said filtering means following an opening operation.

4. The combination in a compressed-gas circuit interrupter of metallic high potential exhaust tank, a pair of terminal bushings having hollow conductor studs extending into said metallic high-potential exhaust tank and carrying metallic exhaust chambers at their inner ends, a pair of orifice-shaped relatively stationary contacts forming a portion of said metallic exhaust chambers, a pair of cooperable movable tubular contacts cooperating with the pair of orifice-shaped relatively stationary contacts to establish a pair of serially-related arcs, filtering means associated with each terminal bushing to purify the arced gas, a high-pressure reservoir disposed within the metallic high-pressure exhaust tank, blast-valve means for releasing a blast of gas from said interiorly-disposed high-pressure reservoir, actuating means actuated from ground potential for effecting opening motion of the pair of cooperable movable tubular contacts, a pair of retractable insulating tubular flow directors actuated by said gas blast for directing the gas blast into the metallic exhaust chambers, and the exhaust arced gas passing through said filtering means following an opening operation.

5. A compressed-gas circuit interrupter including a metallic tank, means including an upstanding insulating column for supporting said metallic tank up in the air above ground potential, a pair of terminal bushings extending into said metallic tank and supporting relatively stationary contact structures at their interior ends, each relatively stationary contact structure including means defining a relatively stationary exhaust chamber, the pair of terminal bushings including tubular conductor studs communicating with said exhaust chambers, relatively movable bridging contact means interconnecting said spaced pair of relatively stationary contact structures, a high-pressure reservoir disposed within said metallic tank, a generally cylindrically-shaped guide tube extending through the high-pressure reservoir for guiding the relatively movable bridging contact means, blast-valve means for releasing a blast of gas out of said high-pressure reservoir and through said guide tube, and actuating means extending upwardly through the hollow insulating column for mechanically opening said relatively movable bridging contact means.

6. A compressed-gas circuit interrupter including a metallic tank, means including an upstanding insulating column for supporting said metallic tank up in the air above ground potential, a pair of terminal bushings extending into said metallic tank and supporting relatively stationary contact structures at their interior ends, each relatively stationary contact structure including means defining a relatively stationary exhaust chamber, the pair of terminal bushings including tubular conductor studs communicating with said exhaust chambers, relatively movable bridging contact means interconnecting said spaced pair of relatively stationary contact structures, a high-pressure reservoir disposed within said metallic tank, a generally cylindrically-shaped guide tube extending through the high-pressure reservoir for guiding the relatively movable bridging contact means, blast-valve means for releasing a blast of gas out of said high-pressure reservoir and through said guide tube, actuating means extending upwardly through the hollow insulating column for mechanically opening said relatively movable bridging contact means, and a pair of retractable spring-biased tubular guide tubes for guiding the gas blast into said relatively stationary exhaust chambers.

7. The combination in a high-power compressed-gas circuit interrupter of a high-potential metallic exhaust tank, insulating column means for supporting said high-potential exhaust tank up in the air above ground potential, a pair of high-pressure reservoir tanks disposed within the outer exhaust tank, blast-valve means associated with each of the high-pressure reservoir tanks, a pair of terminal bushings extending into said exhaust tank and carrying relatively stationary contact means adjacent their interior ends, movable bridging contact means for electrically bridging the relatively stationary contact means in the closed circuit position, and operation of each blast-valve means forcing a blast of gas toward one of the established arcs during the opening operation.

8. The combination in a high-power compressed-gas circuit interrupter of a high-potential metallic exhaust tank, insulating column means for supporting said high-potential exhaust tank up in the air above ground potential, a pair of high-pressure reservoir tanks disposed within the outer exhaust tank, blast-valve means associated with each of the high-pressure reservoir tanks, a pair of terminal bushings extending into said exhaust tank and carrying relatively stationary contact means adjacent their interior ends, movable bridging contact means for electrically bridging the relatively stationary contact means in the closed circuit position, operation of each blast-valve means forcing a blast of gas toward one of the established arcs during the opening operation, and operating rod means extending upwardly through said insulating column means for actuating said movable bridging contact means.

9. A high-power compressed-gas circuit interrupter including a metallic exhaust tank, hollow insulating column means for supporting said metallic exhaust tank up in the air above ground potential, a pair of terminal bushings having tubular conductor studs extending into said metallic exhaust tank and carrying relatively stationary exhaust chambers adjacent their interior ends, a pair of high-pressure reservoir tanks disposed within the metallic exhaust tank, blast-valve means associated with each high-pressure reservoir tank, a U-shaped conducting bridging member, operating rod means extending upwardly through the hollow insulating column means for mechanically actuating said U-shaped conducting bridging member, a pair of spaced relatively stationary contact structures associated with said exhaust chambers, the U-shaped conducting bridging member cooperating with said pair of spaced relatively stationary contact structures to establish two serially related arcs, the operation of each blast-valve means directing a blast of high-pressure gas out of one of the high-pressure reservoir chambers toward one of the arcs, and blast-valve latching means carried by the movable U-shaped conducting bridging member to actuate both blast-valve means.

10. In combination, a terminal bushing including a tubular conductor stud, a hollow exhaust chamber secured to the end of the tubular conductor stud, a pair of insulating bushings extending through the hollow exhaust chamber and having an impedance probe intermediate them, a pair of parallel-disposed impedance sections connecting the outer ends of the latter-mentioned bushings with the exhaust chamber, said exhaust chamber having an opening constituting an orifice-shaped relatively stationary contact, a movable contact cooperable with the relatively stationary contact to establish an arc, and means providing a gas blast into the hollow exhaust chamber to exhaust through the tubular conductor stud.

11. In combination, a terminal bushing including a tubular conductor stud, a hollow exhaust chamber secured to the end of the tubular conductor stud, a pair of insulating bushings extending through the hollow exhaust chamber and having an impedance probe intermediate them, a pair of parallel-disposed impedance sections connecting the outer ends of the latter-mentioned bushings with the exhaust chamber, said exhaust chamber having an opening constituting an orifice-shaped relatively stationary contact, a movable contact cooperable with the relatively stationary contact to establish an arc, means providing a gas blast into the hollow exhaust chamber to exhaust through the tubular conductor stud, and bushing filter-cap means disposed at the other end of the terminal bushing including one or more removable filter cartridges.

12. A compressed-gas circuit interrupter including a relatively stationary contact and a cooperable movable contact separable therefrom to establish an arc, an extensible guide tube disposed exteriorly of the movable contact for guiding a blast of gas and responsive to the blast pressure, a guide sleeve having an inlet port opening disposed intermediate the extensible guide tube and the movable contact, and delaying means for delaying application of the gas blast to the established arc including said extensible guide tube, whereby the established arc may attain a predetermined length prior to application of the gas blast thereon.

13. A compressed-gas circuit interrupter including relatively stationary contact structure including a hollow exhaust chamber, a cooperable movable contact separable from the relatively stationary contact structure to establish an arc, a high-pressure reservoir tank containing gas under pressure, blast-valve means for controlling a blast of gas out of said high-pressure reservoir tank, an extensible insulating guide tube encompassing the movable contact, spring means for effecting retraction of the guide tube, the guide tube directing the gas blast adjacent the arc and into the hollow exhaust chamber, a guide sleeve having an inlet port opening disposed intermediate the extensible guide tube and the movable contact, and delaying means for delaying application of the gas blast to the established arc including said extensible guide tube, whereby the established arc may attain a predetermined length prior to application of the gas blast thereon.

References Cited by the Examiner

UNITED STATES PATENTS

| | | | |
|---|---|---|---|
| 2,507,210 | 5/50 | Ludwig et al. | 200—148 |
| 2,718,542 | 9/55 | Lapsley | 174—35 |
| 2,724,735 | 11/55 | Johnston | 174—35 |
| 2,757,261 | 7/56 | Lingal et al. | 200—148 |
| 2,786,117 | 3/57 | Forwald | 200—148 |
| 3,009,042 | 11/61 | Schrameck et al. | 200—145 |
| 3,009,043 | 11/61 | Goodwin et al. | 200—166 |
| 3,009,983 | 11/61 | Oppel | 174—18 |
| 3,059,044 | 10/62 | Friedrich et al. | 174—18 |
| 3,073,931 | 1/63 | Leeds | 200—148 |
| 3,087,039 | 4/63 | Bachman | 200—166 |
| 3,110,791 | 11/63 | Aspey et al. | 200—145 |

KATHLEEN H. CLAFFY, *Primary Examiner.*

ROBERT K. SCHAEFER, ROBERT S. MASON, *Examiners.*